Jan. 19, 1971　　　R. C. BOWSER　　　3,555,925
STEERING WHEEL
Filed Sept. 27, 1968
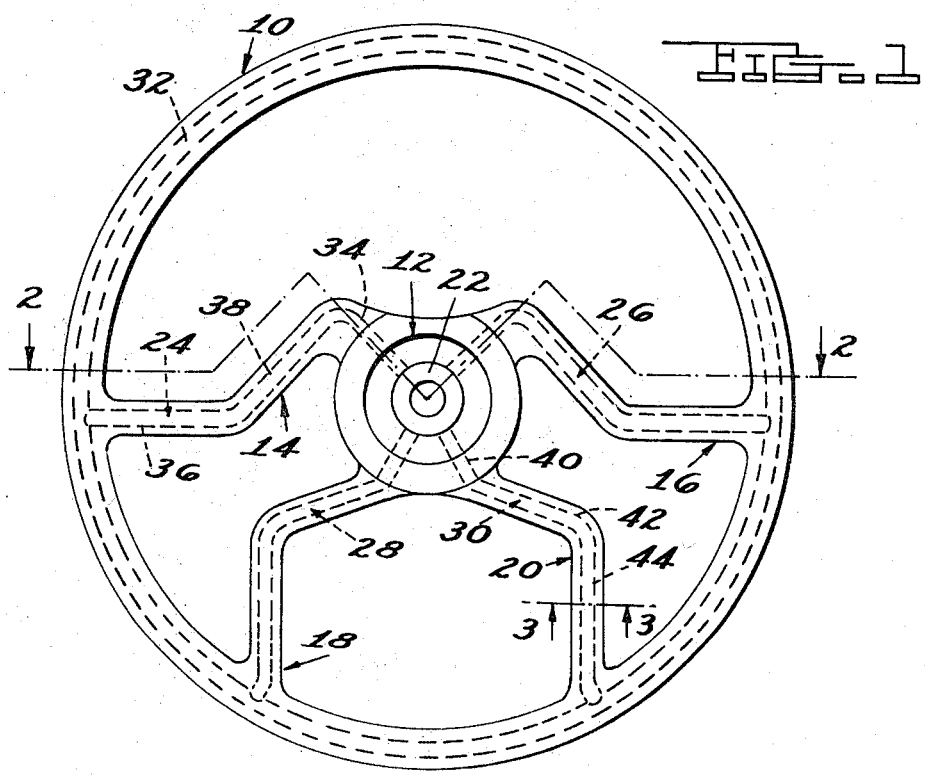
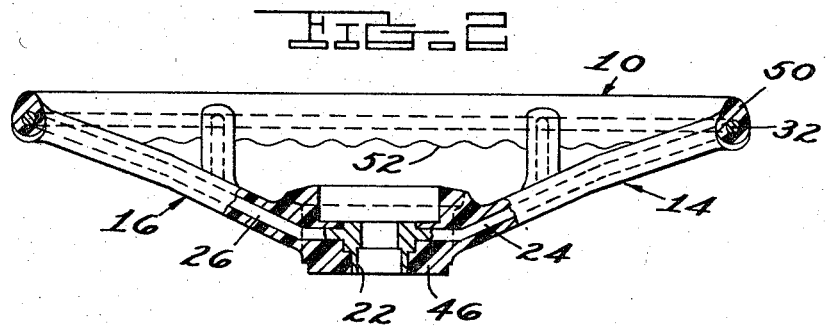
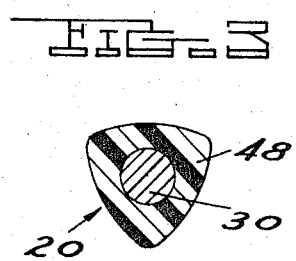
INVENTOR
ROBERT C. BOWSER
BY John R. Faulkner
Clifford L. Sadler
ATTORNEYS United States Patent Office 3,555,925
Patented Jan. 19, 1971

3,555,925
STEERING WHEEL
Robert C. Bowser, Dearborn Heights, Mich., assignor to Ford Motor Company, Dearborn, Mich., a corporation of Delaware
Filed Sept. 27, 1968, Ser. No. 763,235
Int. Cl. B62d 1/04
U.S. Cl. 74—552        5 Claims

ABSTRACT OF THE DISCLOSURE

An energy absorbing steering wheel for a motor vehicle having a rim portion, a hub portion and a plurality of spokes interconnecting the two portions. Each of the spokes has a substantial non-radial portion set at an angle to an adjacent portion of the spoke.

BACKGROUND OF THE INVENTION

The present invention relates to energy absorbing steering wheels for motor vehicle that are constructed to collapse upon impact at a controlled reduced rate. Energy absorbing steering wheel structures are generally known in the art for use in automobiles where the axis of the steering shaft is set at a nominal angle to the horizontal. In automotive steering wheels, the collapsible structure is usually located in the hub portion of the wheel.

The present invention has particular application to steering wheels for trucks where the axis of the steering shaft is only slightly displaced from the vertical. In the present invention, the steering wheel is constructed to collapse when a load is imposed upon its rim portion in a direction toward the axis of the wheel.

BRIEF SUMMARY OF THE DISCLOSURE

A collapsible steering wheel according to the present invention is achieved in its preferred embodiment by a wheel having a hub portion, a rim portion and a plurality of spokes connecting the hub portion and the rim portion. Each of the spokes is divided into inner, outer and intermediate segments. Each of the intermediate segments is arranged at an angle to the adjacent inner and outer segments and at an angle to a radial line extending from the hub of the wheel. The several segments are joined at obtuse angles which facilitate the collapse of the spokes and the wheel when a load is imposed upon the rim.

BRIEF DESCRIPTION OF THE DRAWINGS

The many objects and advantages of the present invention will become apparent upon consideration of the following discussion and the accompanying drawings in which:

FIG. 1 is a top plan view of a steering wheel constructed in accordance with this invention;

FIG. 2 is an elevational view, partly in section, taken along section lines 2—2 of FIG. 1; and FIG. 3 is a sectional view through one of the spokes taken along section lines 3—3 of FIG. 1.

DETAILED DESCRIPTION OF THE PREFERRED EMBODIMENT

Referring now to the drawings for a detailed understanding of the present invention, FIG. 1 discloses an energy absorbing steering wheel having a rim portion 10, a hub portion 12 and a plurality of spokes interconnecting the two portions. The spokes include a first pair of spokes 14 and 16 and a second pair of spokes 18 and 20.

The steering wheel of FIG. 1 is constructed with a metal core and a plastic covering molded about the core. The hub portion has a machined part 22 that is constructed for attachment to the upper end of a steering shaft. Heavy wires 24 and 26 are welded to the part 22 and form the core of the spokes 14 and 16. Wires 28 and 30 are also welded to the hub part 22 and these wires form the core of the spokes 18 and 20. A circular wire 32 forms the core of the rim 10 and is welded to the outer ends of the spoke wires 24, 26, 28 and 30.

Each of the spokes 14 and 16 has a radially extending inner portion 34. Inner portion 34 is integrally connected to an intermediate portion 38 which, in turn, is integrally connected to an outer portion 36. The intermediate portion 38 is arranged at an angle to both of the portions 34 and 36. The outer ends of the outer portions 36 are secured to the rim 10.

The outer portions 36 of the spokes 14 and 16 are in axial alignment. In addition, the outer portions 36 are parallel to and slightly spaced apart from an imaginary horizontal diametrical line.

Each of the spokes 18 and 20 has an inner portion 40 that extend generally radially from the hub 22. An intermediate portion 42 forms an obtuse angle with the inner portion 40. An outer portion 44 meets the intermediate portion 42 at an obtuse angle and is secured to the wire loop 32 of rim 10. The outer portions 44 of the spokes 18 and 20 are arranged generally parallel to each other and at an angle to a radial line extending from the hub 22 through the axes of the inner portions 40.

A relatively thick plastic covering 46 is molded about the hub 22. As seen in FIG. 3, spokes 14, 16, 18 and 20 have plastic material 18 molded about the wires 24, 26, 28 and 30. The rim 10 of the steering wheel is formed with a plastic material 50 molded about the wire rod 32. Spaced ridges 52 are formed on the rim material 50 and these ridges provide a gripping surface for the driver. In a sense, the wire rods form a load carrying reinforcement for the plastic material of the steering wheel.

OPERATION

The steering wheel of this invention is constructed to absorb an impact striking the rim in a generally radial direction toward the axis of the wheel. Although adaptable to other applications, the wheel is designed principally for use in heavy trucks of the cab-over type where the steering shaft extends upwardly at only a slight angle to the vertical.

Each of the several spokes connecting the hub to the irm has two angles or bends which facilitates the collapsing of the wheel when a force is imposed upon the rim. Each of the spokes has a non-radial intermediate portion whereby substantial portions of the spokes are loaded in bending upon impact rather than in compression. Being loaded in bending, the spokes are more susceptible to collapse or buckling, however, the spokes provide adequate ridgidity to the wheel when it is used for its intended normal purpose.

The foregoing description presents the presently preferred embodiment of this invention. Modifications and alterations may occur to those skilled in the art which will come within its scope and spirit.

I claim:
1. An energy absorbing steering wheel for a motor vehicle having a hub portion, a rim portion, and spoke means interconnecting said hub portion and said rim portion, said spoke means including a pair of spokes, each of said spokes having first and second portions arranged at an angle with respect to each other, one of said spoke portions extending in a non-radial direction with respect to said hub when said steering wheel is observed in the plan view, said one spoke portions of said pair of spokes being arranged parallel to each other.

2. An energy absorbing steering wheel according to claim 1 and including:

said spoke means comprising a second pair of spokes each having a portion, said portions being arranged in axial alignment.

3. An energy absorbing steering wheel according to claim 1 and including:

said pair of spokes having inner, intermediate and outer portions, said intermediate and outer portions of each of said spokes being arranged at an angle to each other and to an imaginary radial line from said hub, said outer portions of said spokes being arranged parallel to each other.

4. An energy absorbing steering wheel according to claim 1 and including:

said pair of spokes having inner, intermediate and outer portions, said intermediate and outer portions of each of said pair of spokes being arranged at an angle to each other and to an imaginary radial line from said hub, said outer portions of said pair of spokes being arranged parallel to each other, said spoke means also comprising a second pair of spokes each having inner, intermediate and outer portions, said inner portions of said second spokes extending in a generally radial direction with respect to said hub, said intermediate portions of said second spokes being arranged at an angle to both said inner and outer portions of said second spokes and said outer portions of said second spokes being in axial alignment.

5. An energy absorbing steering wheel for a motor vehicle having a hub portion, a rim portion, and spoke means interconnecting said hub portion and said rim portion, said spoke means comprising a pair of spokes, each of said spokes having inner, intermediate and outer portions, said inner portions being connected to said hub portion and extending in a generally radial direction therefrom, said outer portions being connected to said rim portion and being arranged in axial alignment parallel to an imaginary perpendicular line passing through the axis of rotation of said wheel, said intermediate portion being constructed and arranged to interconnect said outer and inner portions, said inner and intermediate portions of said pair of spokes being arranged in the general shape of a W.

References Cited

UNITED STATES PATENTS

| D. 159,930 | 8/1950 | Ross | 74—552X |
| D. 171,163 | 12/1953 | McCreary | 74—552X |
| 2,347,135 | 4/1944 | Smith | 74—552(UX) |
| 2,631,204 | 3/1953 | Kibiger | 74—552X |

OTHER REFERENCES

Automotive and Aviation Industries Magazine, Nov. 15, 1945 issue, p. 134.

FRED C. MATTERN, JR., Primary Examiner

F. D. SHOEMAKER, Assistant Examiner